(12) United States Patent
Niwa et al.

(10) Patent No.: US 8,151,098 B2
(45) Date of Patent: Apr. 3, 2012

(54) PERIODIC SIGNAL PROCESSING APPARATUS

(75) Inventors: Akimasa Niwa, Kiyosu (JP); Masahiro Kamiya, Nishio (JP); Hideaki Ishihara, Okazaki (JP); Yoshinori Teshima, Toyota (JP)

(73) Assignee: DENSO CORPORATION, Kariya (JP)

( * ) Notice: Subject to any disclaimer, the term of this patent is extended or adjusted under 35 U.S.C. 154(b) by 667 days.

(21) Appl. No.: 12/320,800

(22) Filed: Feb. 5, 2009

(65) Prior Publication Data

US 2009/0204841 A1 Aug. 13, 2009

(30) Foreign Application Priority Data

Feb. 7, 2008 (JP) .................................. 2008-27673
Sep. 4, 2008 (JP) ................................ 2008-227014

(51) Int. Cl.
*G06F 9/48* (2006.01)

(52) U.S. Cl. ............ 712/244; 712/35; 710/262; 701/38; 713/502

(58) Field of Classification Search .................... 712/35, 712/244; 710/260, 261, 262, 263, 264, 265, 710/266, 267, 268, 269; 701/38; 713/502
See application file for complete search history.

(56) References Cited

U.S. PATENT DOCUMENTS 6,467,347 B1    10/2002    Fujimoto

FOREIGN PATENT DOCUMENTS

| JP | A-02-041269 | 2/1990 |
|---|---|---|
| JP | A-03-054476 | 3/1991 |
| JP | A-03-163363 | 7/1991 |
| JP | A-07-286852 | 10/1995 |
| JP | A-10-207716 | 8/1998 |
| JP | A-2001-188011 | 7/2001 |
| JP | A-2003-214893 | 7/2003 |
| JP | A-2004-199393 | 7/2004 |
| JP | A-2004-239907 | 8/2004 |
| JP | A-2004-526942 | 9/2004 |
| JP | A-2006-234710 | 9/2006 |

OTHER PUBLICATIONS

Office Action issued on Mar. 2, 2010 by the Japan Patent Office in corresponding Japanese Application No. 2008-227014.
Office Action dated Jun. 8, 2010 issued from the Japan Patent Office for corresponding Japanese patent application No. 2008-227014.

*Primary Examiner* — William M Treat

(74) *Attorney, Agent, or Firm* — Posz Law Group, PLC

(57) ABSTRACT

A signal processing apparatus for processing a periodic signal outputted from a signal source has a central processing unit and a task switch timer. The central processing unit performs multiple tasks including a signal processing task in parallel. In the signal processing task, the central processing unit starts to process the periodic signal after performing a synchronization processing to synchronize with the periodic signal, setting the task switch timer to a predetermined time upon completion of the synchronization processing, and enabling an interrupt to the central processing unit upon completion of the synchronization processing. The task switch timer disables the interrupt to the central processing unit immediately before expiring. The task switch timer outputs a task switch signal to the central processing unit when expiring, so that the central processing unit switches to the signal processing task.

7 Claims, 10 Drawing Sheets

FIG. 2
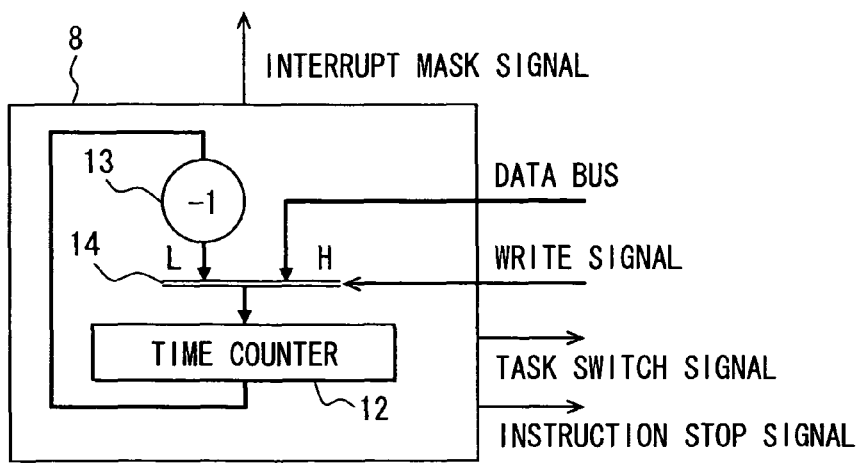
FIG. 3A
DATA BUS
FIG. 3B
WRITE SIGNAL
FIG. 3C
TIME COUNTER
FIG. 3D
INTERRUPT MASK SIGNAL
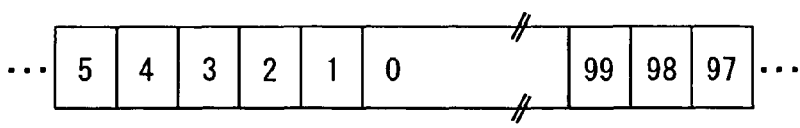
FIG. 3E
INSTRUCTION STOP SIGNAL
FIG. 3F
TASK SWITCH SIGNAL

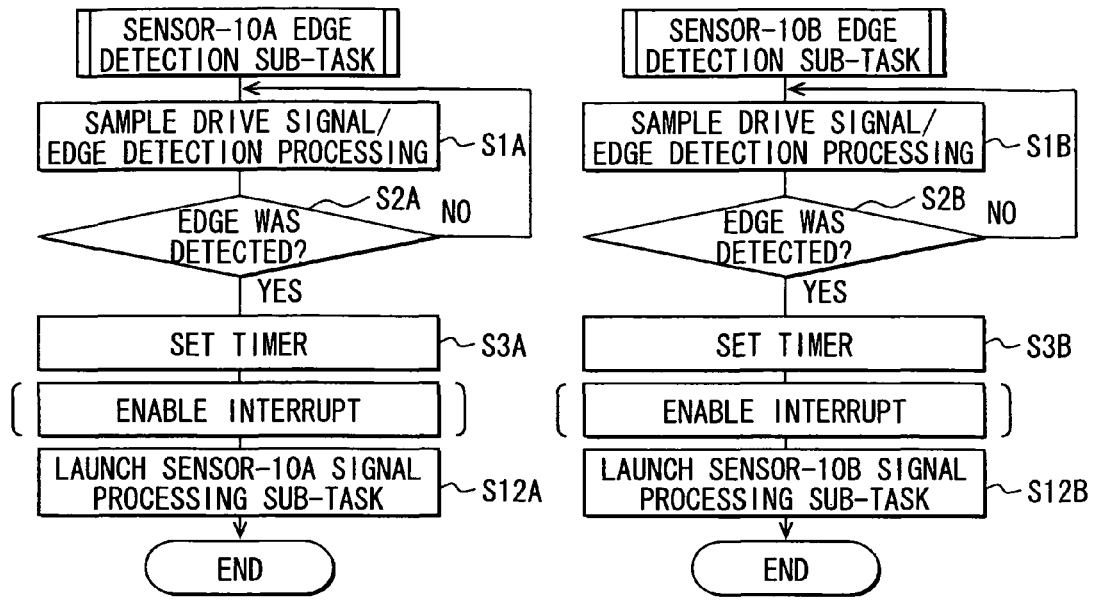
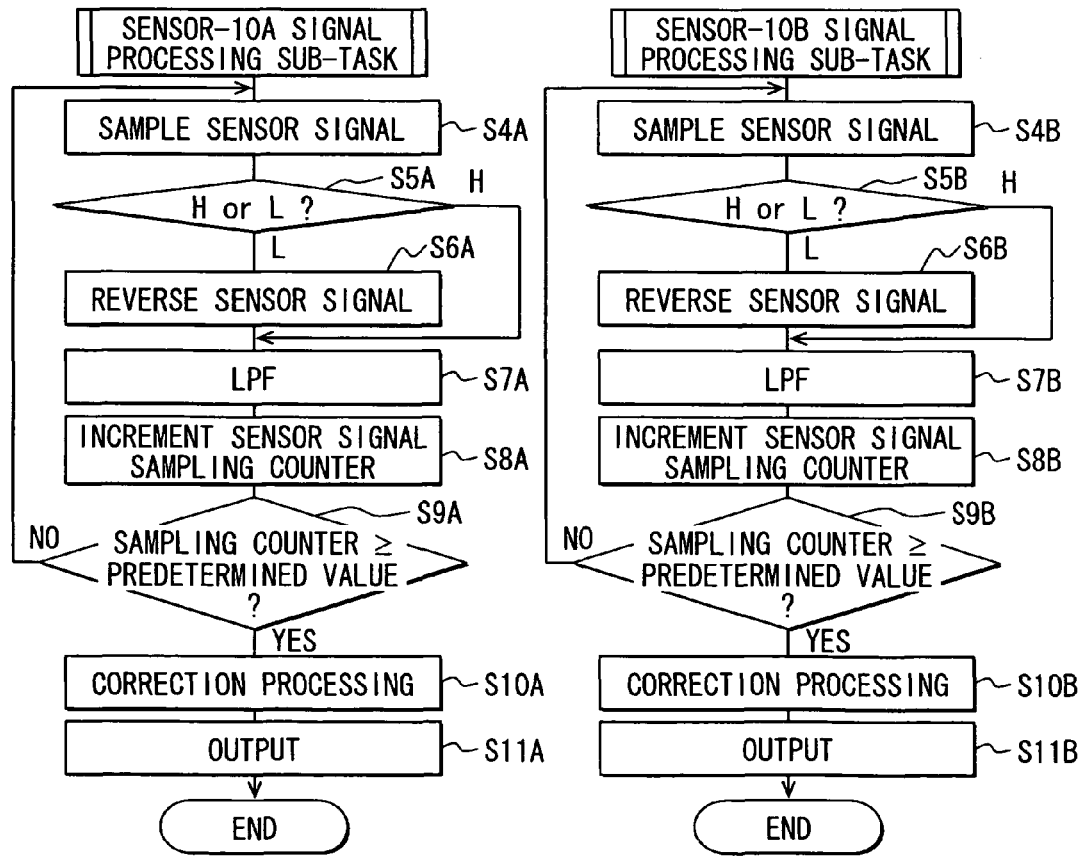

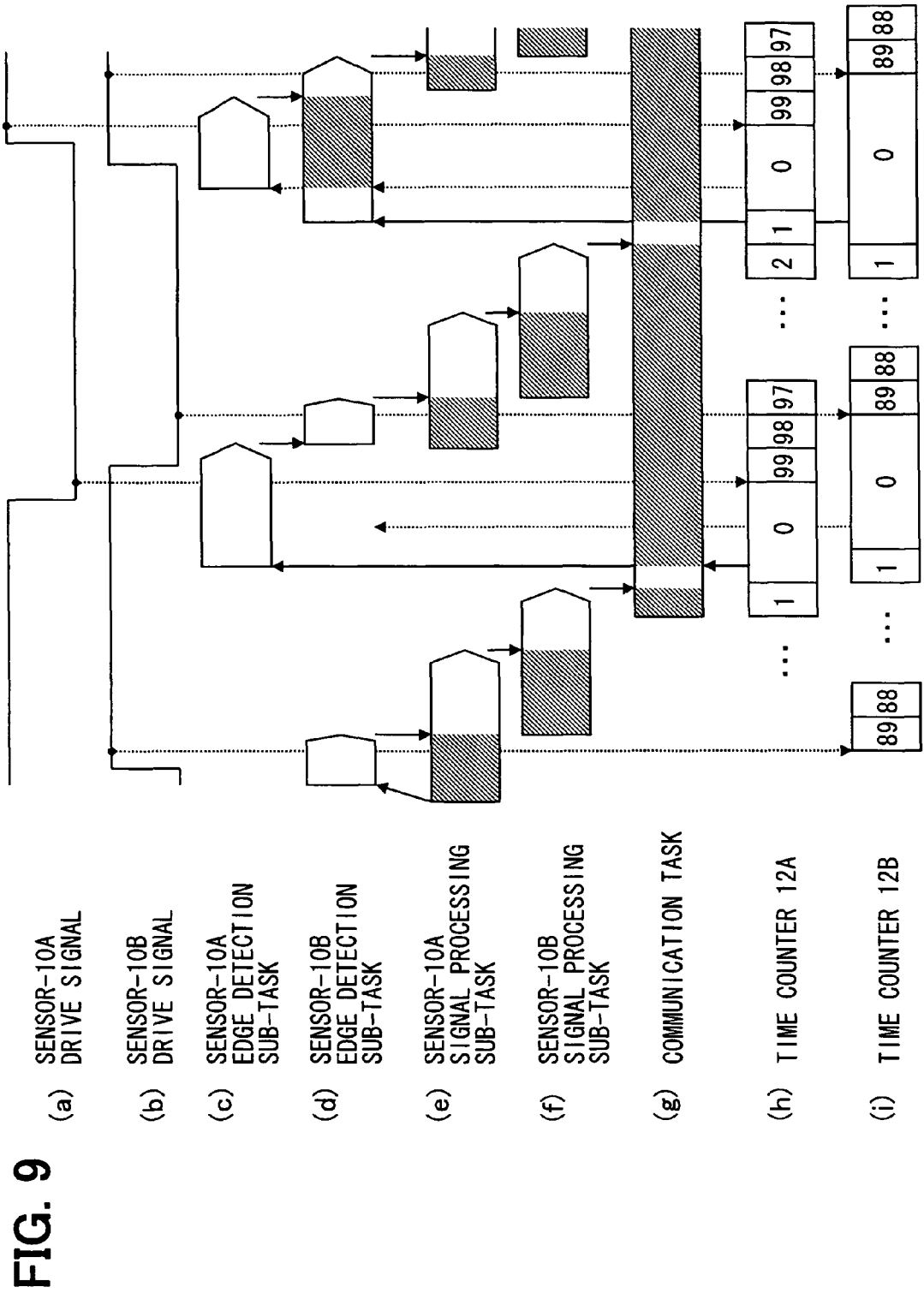

FIG. 11 PRIOR ART
(a)
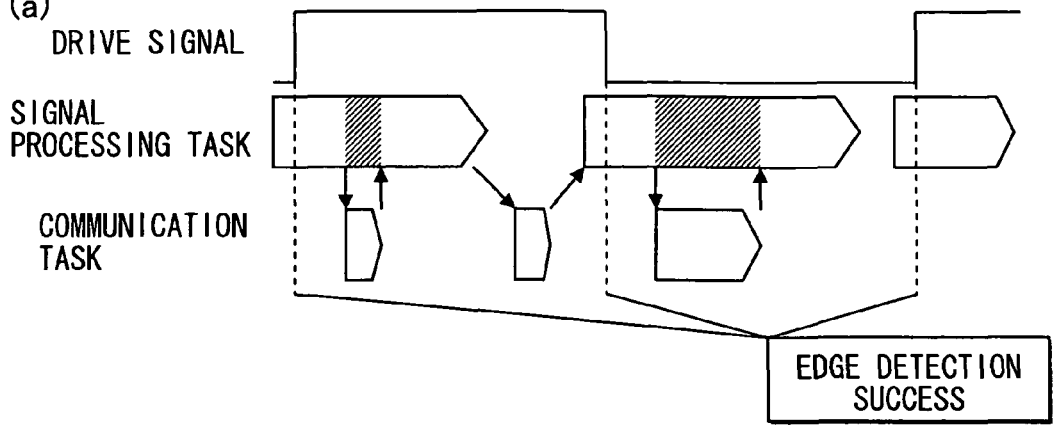
(b)
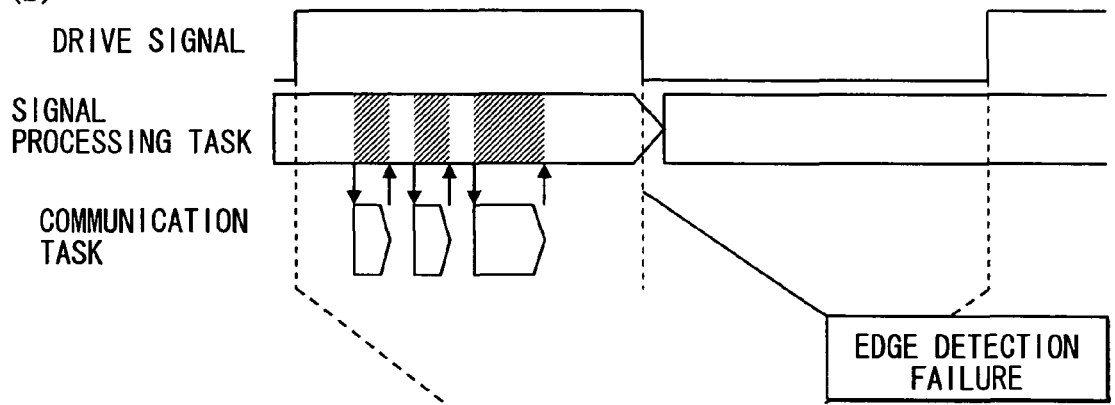
(c)
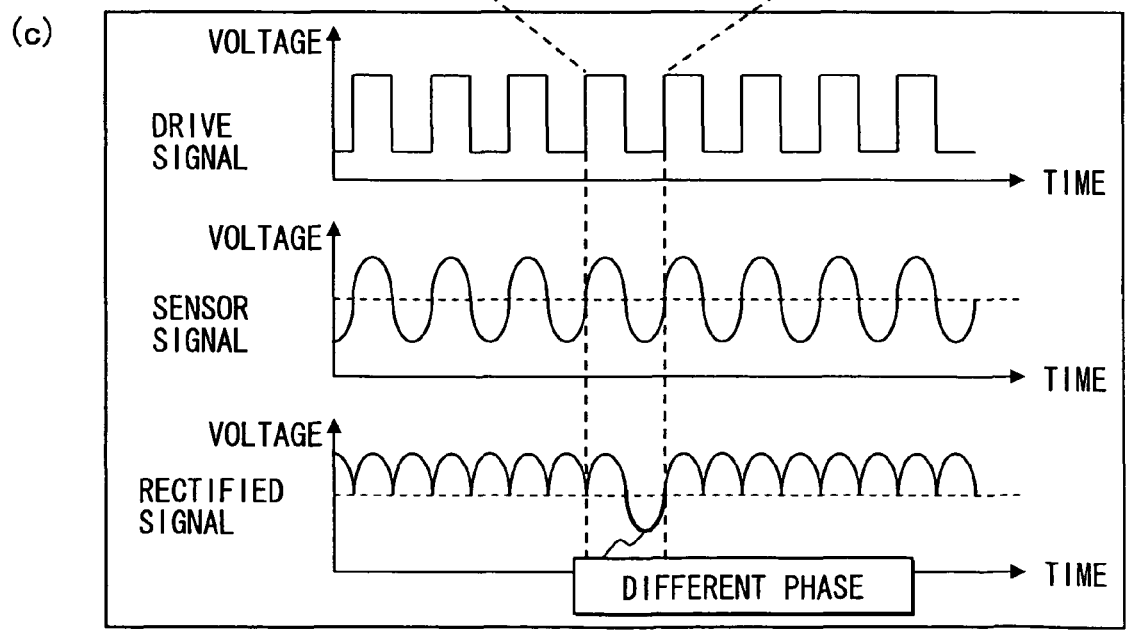

PERIODIC SIGNAL PROCESSING APPARATUS

CROSS REFERENCE TO RELATED APPLICATION

This application is based on and incorporates herein by reference Japanese Patent Applications No. 2008-27673 filed on Feb. 7, 2008 and No. 2008-227014 filed on Sep. 4, 2008.

FIELD OF THE INVENTION

The present invention relates to a signal processing apparatus for processing a periodic signal outputted from a signal source.

BACKGROUND OF THE INVENTION

Recently, there have been an increased number of vehicles equipped with a yaw rate sensor for measuring a vehicle's angular velocity around its vertical axis. The yaw rate sensor includes an oscillating body periodically oscillating in a first direction and measures the angular velocity by detecting an oscillation in a second direction perpendicular to the first direction. The yaw rate sensor outputs a sensor signal having a voltage corresponding to the detected angular velocity. Generally, the sensor signal is synchronously detected based on an oscillation frequency of the oscillating body. The detected sensor signal is full-wave-rectified and then filtered so that necessary signal components can be extracted. For example, JP-A-2003-214893 discloses a filter circuit for filtering a sensor signal outputted from a yaw rate sensor.

The signal processing task described above is performed by using a processor such as a digital signal processor (DSP) or a central processing unit (CPU). Typically, the processor performs the signal processing task and another task such as a communication task in parallel. When the communication task needs to be performed, the processor receives an interrupt request. Upon reception of the interrupt request, the processor suspends the signal processing task and then starts to perform the communication task as shown in (a) of FIG. 11. As a result, the signal processing task is kept in a wafting state indicated by diagonal lines in (a) of FIG. 11, until the processor completes the communication task.

An edge of a squire drive signal having a frequency equal to the oscillation frequency of the oscillating body needs to be detected in order to perform a synchronous detection of the sensor signal. However, as shown in (b) of FIG. 11, the edge detection may result in failure depending on the timing of the interrupt request. If the edge detection results in failure, the detected sensor signal is incompletely rectified. As a result, the detected sensor signal may contain different phase components as shown in (c) of FIG. 11.

For example, the edge detection failure may be avoided by causing the processor to operate at high frequency or by using a coprocessor. However, this method increases consumption current, circuit size, and cost.

SUMMARY OF THE INVENTION

In view of the above, it is an object of the present invention to provide a signal processing apparatus that processes a periodic signal outputted from a signal source by surely synchronizing with the periodic signal.

According to an aspect of the present invention, a signal processing apparatus for processing a periodic signal outputted from a signal source includes a central processing unit and a task switch timer. The periodic signal varies depending on a physical quantity detected by the signal source or an operating condition of the signal source. The central processing unit performs multiple tasks in parallel. The multiple tasks includes a signal processing task for processing the periodic signal. The task switch timer outputs a task switch signal for causing the central processing unit to switch between the multiple tasks. In the signal processing task, the central processing unit starts to process the periodic signal after performing a synchronization processing to synchronize with the periodic signal, setting the task switch timer to a predetermined time upon completion of the synchronization processing, and enabling an interrupt to the central processing unit upon completion of the synchronization processing. The interrupt requests the central processing unit to perform another task. The task switch timer disables the interrupt to the central processing unit immediately before the task switch timer expires. The task switch timer outputs the task switch signal to the central processing unit when the task switch timer expires, so that the central processing unit can switch to and perform the signal processing task.

BRIEF DESCRIPTION OF THE DRAWINGS

The above and other objectives, features and advantages of the present invention will become more apparent from the following detailed description made with check to the accompanying drawings. In the drawings:

FIG. 2 is a diagram illustrating a task switch timer of the signal processing apparatus of FIG. 1;

FIGS. 3A-3F are timing diagrams of the task switch timer of FIG. 2;

FIGS. 8A-8D are flow diagrams of a signal processing task performed by a central processing unit of the signal processing apparatus of FIG. 6;

FIG. 9 is a timing diagram corresponding to the flow diagrams of FIGS. 8A-8D;

FIG. 11 is a timing diagram according to a prior art apparatus.

DETAILED DESCRIPTION OF THE PREFERRED EMBODIMENTS

First Embodiment

Figure 1:
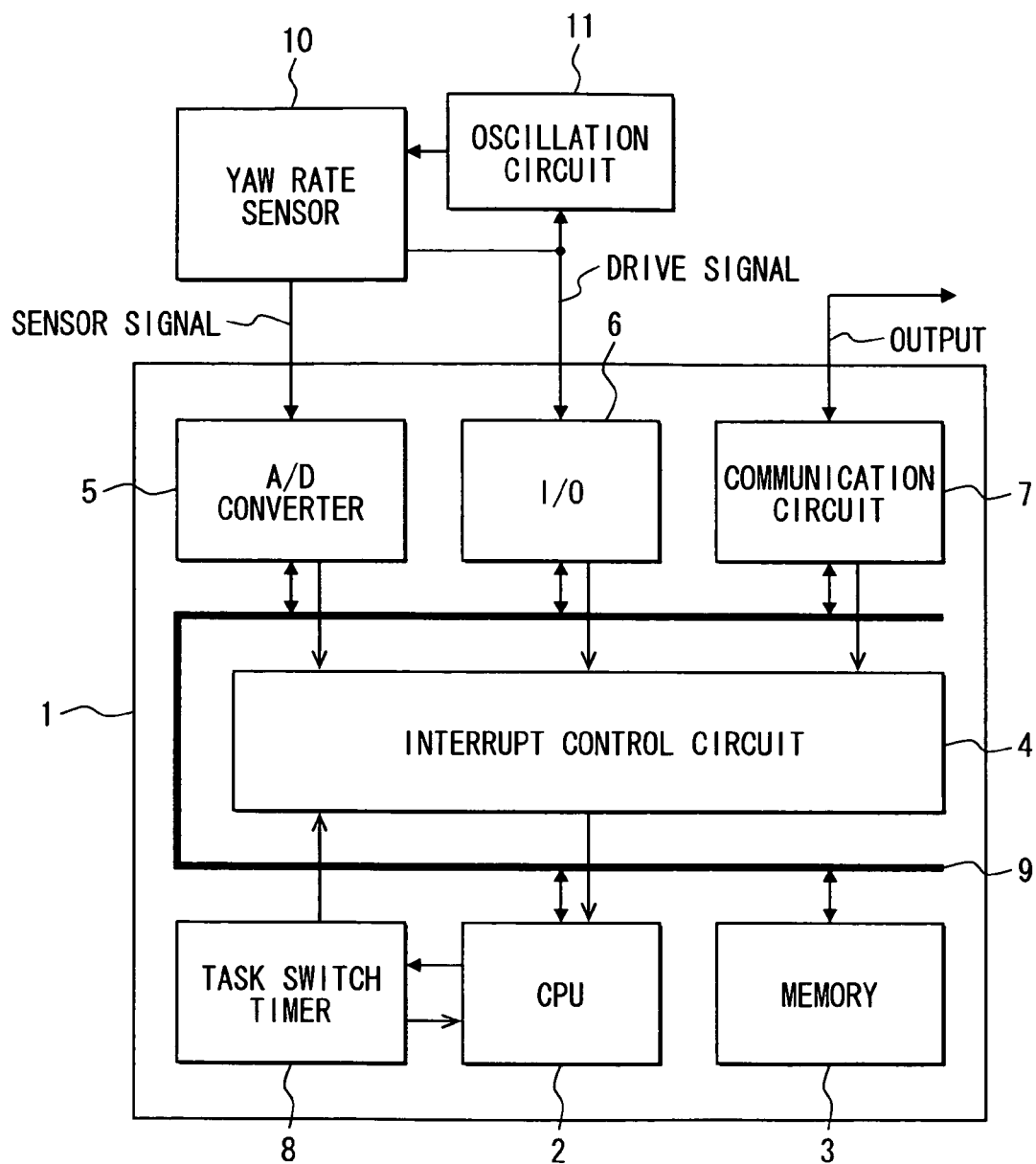
FIG. 1 is a block diagram of a signal processing apparatus according to a first embodiment of the present invention.

A microcomputer 1 (as a periodic signal processing apparatus) according to a first embodiment of the present invention is described below with reference to FIGS. 1-5. For example, the microcomputer 1 can be applied to an electronic control unit (ECU) mounted on a vehicle. As shown in FIG. 1, the microcomputer 1 includes a central processing unit (CPU) 2, a memory 3, an interrupt control circuit 4, an analog-to-digital (A/D) converter 5, an input/output (I/O) port 6, a communication circuit 7, and a task switch timer 8. The CPU 2, the memory 3, the interrupt control circuit 4, the A/D converter 5, the I/O port 6, the communication circuit 7, and the task switch timer 8 are connected together via an address/data bus 9.

The memory 3 includes a read only memory (ROM), a random access memory (RAM), and/or the like. The memory 3 stores various data and a control program for the CPU 2. Also, the memory 3 is used as a work area, when the CPU 2 performs processing in accordance with the control program stored in the memory 3. The interrupt control circuit 4 controls interrupt requests to the CPU 2 produced by the A/D converter 5, the I/O port 6, and the communication circuit 7. The A/D converter 5 performs an A/D conversion of a sensor signal (as a periodic signal) outputted from a yaw rate sensor 10 (as a signal source). When the A/D conversion is completed, the A/D converter 5 generates an A/D-conversion interrupt request to the CPU 2.

The yaw rate sensor 10 includes an oscillator. An oscillation circuit 11 excites the oscillator of the yaw rate sensor 10. For example, the oscillation circuit 11 can be constructed with inverter gates, resistors, capacitors, and the like. The yaw rate sensor 10 outputs to the I/O port 6 a square drive signal (as a phase signal) accompanying its oscillation action. The CPU 2 detects an edge of the squire drive signal through the I/O port 6. The I/O port 6 retains a level (i.e., high or low) of the square drive signal.

The communication circuit 7 performs communication with another microcomputer (not shown) such as an ECU mounted on the vehicle via an in-vehicle local area network (LAN) or the like. When the other microcomputer starts to communicate with the microcomputer 1, the other microcomputer generates a communication-start interrupt request to the CPU 2.

The CPU 2 performs multiple tasks in parallel according to the control program stored in the memory 3. In the first embodiment, the CPU 2 performs a signal processing task and a communication task in parallel. In the signal processing task, the CPU 2 processes the sensor signal outputted from the yaw rate sensor 10. In the communication task, the CPU 2 processes the communication with the other microcomputer through the communication circuit 7. The task switch timer 8 generates a task switch signal that causes the CPU 2 to switch between the signal processing task and the communication task.

The task switch timer 8 is described in detail below with reference to FIGS. 2 and 3A-3F. FIG. 2 illustrates a configuration of the task switch timer 8, and FIGS. 3A-3F illustrate timing diagrams of the task switch timer 8. As shown in FIG. 2, the task switch timer 8 includes a time counter 12, a subtractor 13, and a multiplexer 14. As shown in FIGS. 3A-3C, when a write signal becomes active (high), the CPU 2 is enabled to set count data (e.g., "99") to the time counter 12 through the multiplexer 14. During a period of time the write signal is inactive (low), the subtractor 13 decrements by one the count data in the time counter 12 every clock cycle of a clock signal (not shown). Thus, the task switch timer 8 serves as a countdown timer.

As shown in FIGS. 3C and 3D, when the time counter 12 is decremented to "3", the task switch timer 8 activates an interrupt mask signal. When the interrupt mask signal is active (high), the interrupt control circuit 4 disables an interrupt to the CPU 2. Further, as shown in FIGS. 3C and 3E, when the time counter 12 is decremented to "3", the task switch timer 8 activates an instruction stop signal. When the instruction stop signal is active (high), the CPU 2 is disabled to perform a new instruction upon completion of an instruction that is currently being performed. Then, as shown in FIGS. 3C-3E, when the time counter 12 is decremented to "0", the task switch timer 8 inactivates each of the interrupt mask signal and the instruction stop signal. Further, as shown in FIG. 3F, when the time counter 12 is decremented to "0", the task switch timer 8 outputs the task switch signal to the CPU 2 during one clock cycle.

As described above, the task switch signal is outputted after the interrupt stop signal is activated. This is for the following reason: It takes time from when the CPU 2 starts an instruction to when the CPU 2 completes the instruction. By activating the interrupt stop signal before the task switch signal is outputted to the CPU 2, the CPU 2 can complete the current instruction before receiving the task switch signal. Thus, upon reception of the task switch signal, the CPU 2 can smoothly switches between the signal processing task and the communication task.

In the first embodiment, as shown in FIG. 3E, the instruction stop signal is kept active for a time period equivalent to four clock cycles. The length of the time period during which the instruction stop signal is kept active can be determined according to a maximum number of clock cycles required for the CPU 2 to complete the instruction. For example, when the CPU 2 employs a pipeline processing method, the length of the time period is determined so that the current instruction can finish the last stage of a pipeline.

Upon reception of the task switch signal, the CPU 2 switches to and perform the signal processing task. If the CPU 2 is currently performing the communication task at the time of reception of the task switch signal, the CPU 2 suspends the communication task and saves values of registers such as a program counter, a status register, and a condition code register, to a saved register or a stack area. After the values of the registers are saved to the saved register or the stack area, the CPU 2 starts to perform the signal processing task.

The signal processing task performed by the CPU 2 is described below with reference to a flow diagram of FIG. 4. The signal processing task starts at step S1, where the CPU 2 samples the square drive signal through the I/O port 6 and performs an edge detection processing (i.e., synchronization processing) to detect an edge of the square drive signal. The level (i.e. high or low) of the sampled square drive signal is stored to the memory 3. As of step S1, the interrupt to the CPU 2 remains disabled by the task switch timer 8.

In the edge detection processing, the CPU 2 compares the level of the currently-sampled square drive signal with the level of the previously-sampled square drive signal. The edge of the square drive signal is detected when the level of the currently-sampled square drive signal is different than the level of the previously-sampled square drive signal. If the CPU 2 does not detect the edge of the square drive signal corresponding to NO (N) at step S2, the signal processing task returns to step S1. Conversely, if the CPU 2 detects the edge of the square drive signal corresponding to YES (Y) at step S2, the signal processing task proceeds to step S3.

At step S3, the CPU 2 sets the count data (e.g., "99") to the task switch timer 8. At this time, the CPU 2 resets an interrupt disable flag set in the interrupt control circuit 4. As a result, the interrupt to the CPU 2 is enabled. The count data set to the task switch timer 8 at step S3 is less than a value corresponding to one-half of a period of the square drive signal.

Then, the signal processing task proceeds to step S4, where the CPU 2 samples the sensor signal outputted from the yaw rate sensor 10 through the A/D converter 5. Then, the signal processing task proceeds to step S5, where the CPU 2 determines whether the level of the square drive signal sampled at step S1 is high (H) or low (L).

If the level of the square drive signal is high, the signal processing task jumps to step S7 by skipping over step S6. Conversely, if the level of the square drive signal is low, the signal processing task proceeds to step S6, where the CPU 2 reverses the polarity of the sensor signal. Specifically, at step 6, the level of the sensor signal is reversed relative to a median between a maximum value of an amplitude of the sensor signal and a minimum value of the amplitude of the sensor signal. Steps S1-S6 achieve the synchronous detection of the sensor signal outputted from the yaw rate sensor 10.

At step S7, the CPU 2 performs digital processing on the sensor signal so that the sensor signal can be low-pass filtered. In this way, the CPU 2 performs filtering of the sensor signal, thereby extracting a direct current (DC) component of the sensor signal. The level of the DC component represents the vehicle's angular velocity detected by the yaw rate sensor 10.

Then, the signal processing task proceeds to step S8, where the CPU 2 increments a sampling counter (not shown) for counting the number of times the CPU 2 samples the sensor signal at step S4. Then, the signal processing task proceeds to step S9, where the CPU 2 determines whether the sampling counter reaches a predetermined value. If the sampling counter does not reach the predetermined value corresponding to NO (N) at step S9, the signal processing task returns to step S4. Conversely, if the sampling counter reaches the predetermined value corresponding to YES (Y) at step S9, the signal processing task proceeds to step S10.

At step S10, the CPU 2 performs a correction processing to correct offset and sensitivity of the sensor signal according to characteristic data (e.g., temperature characteristics) of the yaw rate sensor 10 and the microcomputer 1. For example, the characteristic data can be prestored in the memory 3. Then, the signal processing task proceeds to step S11, where the CPU 2 outputs the corrected sensor signal. Specifically, at step S11, the CPU 2 passes the corrected sensor signal to the communication task side so that the corrected sensor signal can be transmitted to an outside of the microcomputer 1 through the communication circuit 7.

Figure 4:
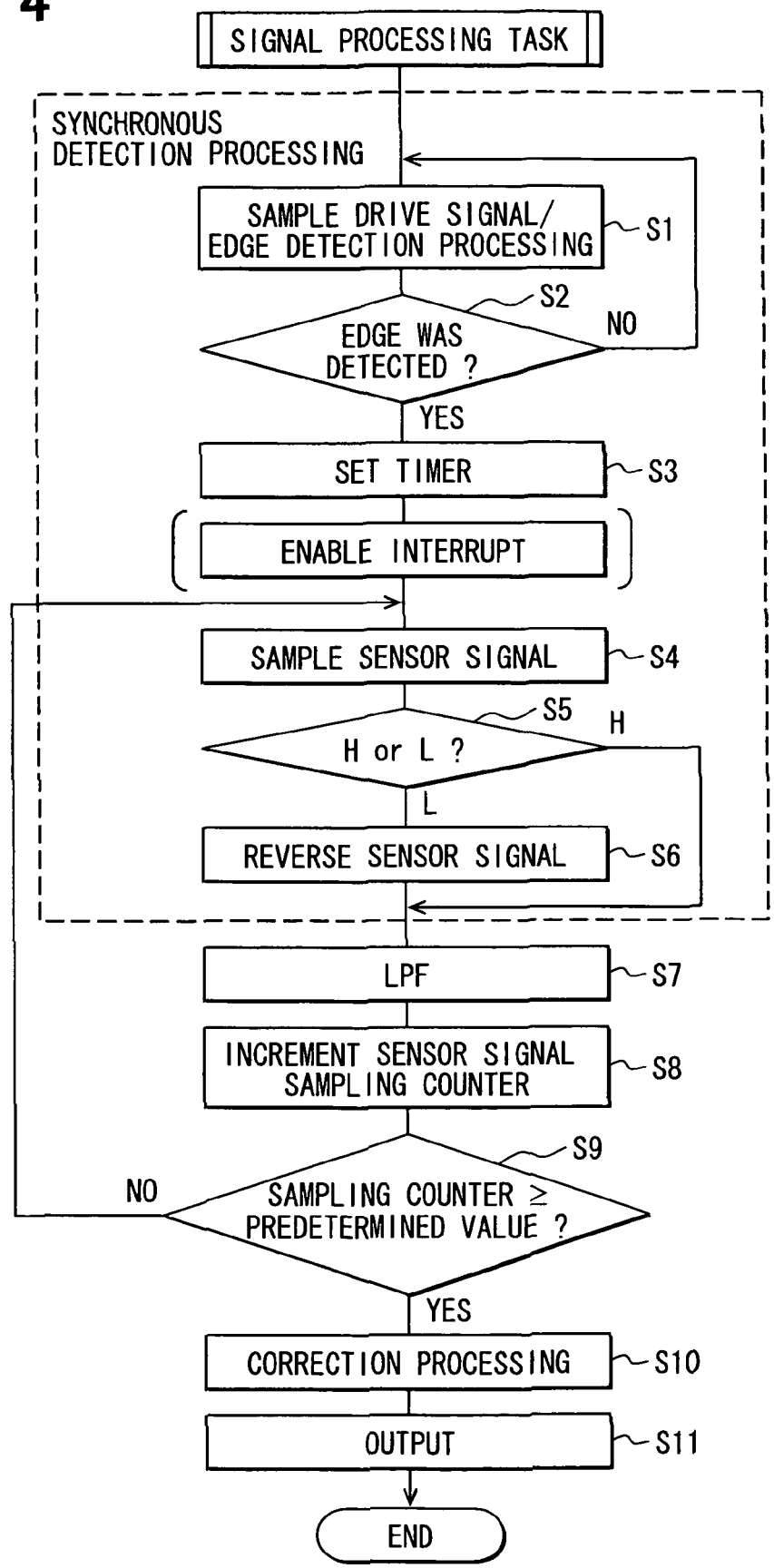
FIG. 4 is a flow diagram of a signal processing task performed by a central processing unit of the signal processing apparatus of FIG. 1.
Figure 5:
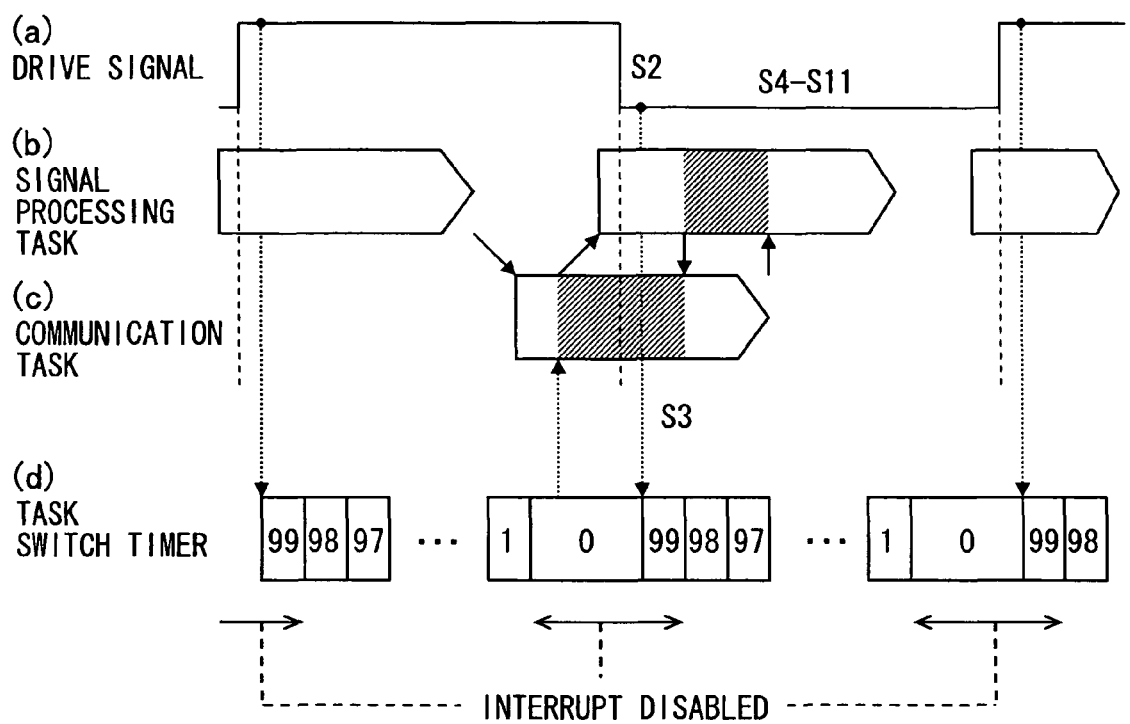
FIG. 5 is a timing diagram corresponding to the flow diagram of FIG. 4.

FIG. 5 illustrates an example of a task scheduling corresponding to the flow diagram of FIG. 4. As shown in (b)-(d) of FIG. 5, if the communication-interrupt request to the CPU 2 occurs during a time period from when the previous signal processing task is completed to when the task switch timer 8 reaches "0" (i.e., expires), the CPU 2 starts to perform the communication task. Then, when the task switch timer 8 reaches "0", the task switch timer 8 outputs the task switch signal to the CPU 2. Upon reception of the task switch signal, the CPU 2 suspends the communication task and then switches to and performs the signal processing task. At this time, the interrupt to the CPU 2 is already disabled.

In the signal processing task, when the CPU 2 completes the edge detection processing of the square drive signal, the interrupt to the CPU 2 is enabled so that the CPU 2 can resume the suspended communication task (refer to (b) and (c) of FIG. 5). That is, since there is some time until the CPU 2 needs to perform the remainder (i.e., steps S4-S11) of the signal processing task after completion of the edge detection processing, the CPU 2 performs the suspended communication task prior to the remainder of the signal processing task. Then, when the CPU 2 completes the suspended communication task, the CPU 2 returns to the signal processing task and performs the remainder of the signal processing task.

As described above, according to the first embodiment, the microcomputer 1 includes the task switch timer 8 for outputting the task switch signal to the CPU 2. In the signal processing task, the CPU 2 performs the edge detection processing to detect the edge of the square drive signal outputted from the yaw rate sensor 10 through the I/O port 6. Upon detection of the edge of the square drive signal, the CPU 2 sets the count data to the time counter 12 of the task switch timer 8. Further, upon detection of the edge of the square drive signal, the CPU 2 resets the interrupt disable flag in the interrupt control circuit 4 so that the interrupt to the CPU 2 can be enabled.

Then, the CPU 2 processes the sensor signal outputted from the yaw rate sensor 10 through the A/D converter 5. The task switch timer 8 disables the interrupt to the CPU 2 immediately before the task switch timer 8 expires (i.e., the time counter 12 reaches "3"). Then, when the task switch timer 8 expires (e.g., the time counter 12 reaches "0"), the task switch timer 8 outputs the task switch signal to the CPU 2.

Thus, the interrupt to the CPU 2 is kept disabled (i.e., masked) during a time period when the CPU 2 performs the edge detection processing of the square drive signal in the signal processing task. Therefore, it is ensured that the edge of the square drive signal can be detected.

Even if the CPU 2 is performing the communication task after the interrupt to the CPU 2 is enabled, the task switch timer 8 outputs the task switch signal to the CPU 2 when expiring. Thus, the CPU 2 can switch and perform the signal processing task before the timing of the next edge of the squire drive signal. In this way, the CPU 2 can surely perform the signal processing task synchronously with the edge detection timing of the square drive signal.

The CPU 2 switches to the communication task, if the communication task is waiting to be performed at the time when the edge of the square drive signal is detected. Then, when the CPU 2 completes the communication task, the CPU 2 switches back to the signal processing task. In this way, the CPU 2 can perform multiple tasks in a balanced manner. Further, the task switch timer 8 outputs the instruction stop signal to the CPU 2 immediately before the task switch timer 8 expires. In such an approach, the CPU 2 can smoothly switch between multiple tasks.

Further, in the signal processing task, the CPU 2 performs the synchronous detection of the sensor signal by sampling the sensor signal synchronously with the edge detection timing of the square drive signal. In such an approach, the CPU 2 samples the sensor signal at a regular interval so that the sampled sensor signal can be properly filtered. Furthermore, since the CPU 2 corrects the filtered sensor signal according to the characteristics of the yaw rate sensor 10 and the components of the microcomputer 1, the sensor signal can be detected with high accuracy.

Second Embodiment

A microcomputer 21 (as a periodic signal processing apparatus) according to a second embodiment of the present invention is described below with reference to FIGS. 6-9. Differences between the first and second embodiments are as follows.

Figure 6:
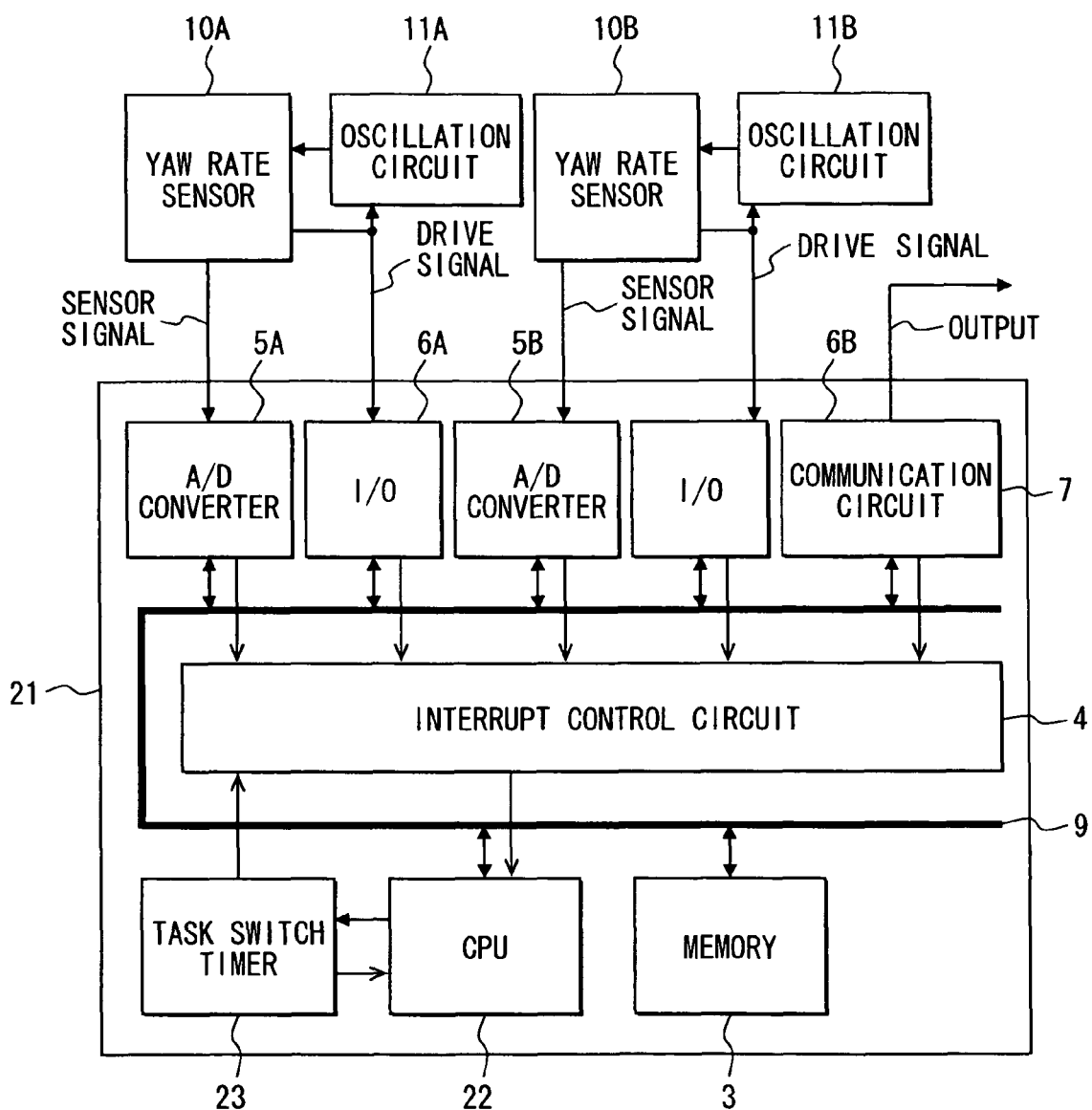
FIG. 6 is a block diagram of a signal processing apparatus according to a second embodiment of the present invention.

As shown in FIG. 6, the microcomputer 21 processes two sensor signals outputted from two yaw rate sensors 10A, 10B in parallel. Accordingly, the microcomputer 21 includes two A/D converters 5A, 5B and two I/O ports 6A, 6B. The microcomputer 21 includes a CPU 22 and a task switch timer 23 instead of the CPU 2 and the task switch timer 8 of the first embodiment.

For example, the yaw rate sensors 10A, 10B can be configured to detect an angular velocity around a common axis in order to provide a redundancy against failure for fail safe operation. Alternatively, the yaw rate sensors 10A, 10B can be configured to detect angular velocities around different axes.

Figure 7:
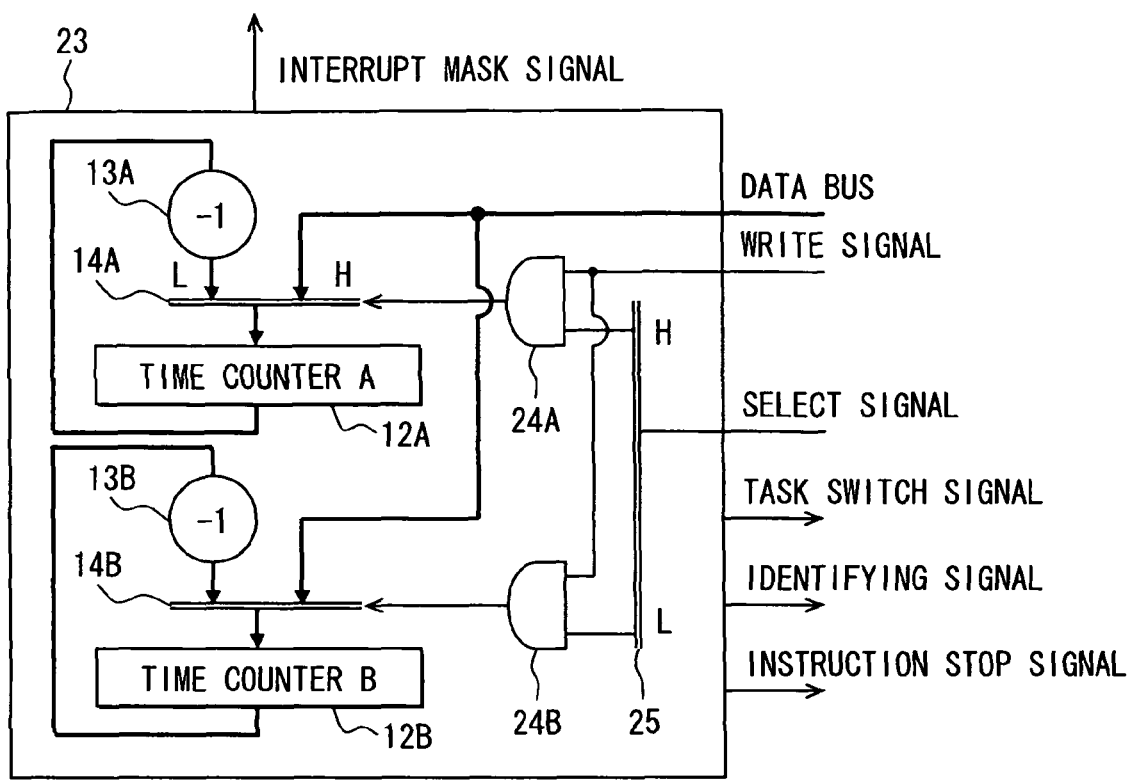
FIG. 7 is a diagram illustrating a task switch timer of the signal processing apparatus of FIG. 6.

FIG. 7 illustrates a configuration of the task switch timer 23. As can be seen by comparing FIGS. 2 and 7, the task switch timer 23 is basically constructed with two sets of the task switch timers 8. Specifically, the task switch timer 23 includes two time counters 12A, 12B, two subtractors 13A, 13B, two multiplexers 14A, 14B, two AND gates 24A, 24B, and a multiplexer 25. The write signal outputted from the CPU 22 is applied to each of first input terminals of the AND gates 24A, 24B.

The multiplexer 25 receives a counter select signal from, for example, an address decoder (not shown). The CPU 22 selects the time counter 12A or the time counter 12B according to the counter select signal. For example, when a level of the counter select signal is high (H), the multiplexer 25 outputs a high level signal to a second input of the AND gate 24A. As a result, an output of the AND gate 24A is asserted so that the time counter 12A can be selected. Conversely, when the level of the counter select signal is low (L), the multiplexer 25 outputs the high level signal to a second input of the AND gate 24B. As a result, an output of the AND gate 24B is asserted so that the time counter 12B can be selected.

The task switch timer 23 outputs an identifying signal to the CPU 22 in addition to the task switch signal, when the time counter 12A or the time counter 12B reaches "0" (i.e., expires). The identifying signal indicates which of the time counters 12A, 12B caused the task switch signal. That is, the identifying signal indicates which of the time counters 12A, 12B expired. For example, a level of the identifying signal can be low (L), when the task switch signal is outputted due to the fact that the time counter 12A reaches "0", and the level of the identifying signal can be high (H), when the task switch signal is outputted due to the fact that the time counter 12B reaches "0".

The signal processing task performed by the CPU 22 is described below with reference to FIGS. 8A-8D. The signal processing task comprises a first signal processing task for the yaw rate sensor 10A and a second signal processing task for the yaw rate sensor 10B. The first signal processing task includes a sensor-10A edge detection sub-task represented by FIG. 8A and a sensor-10A signal processing sub-task represented by FIG. 8B. Likewise, the second sensor signal processing task includes a sensor-10B edge detection sub-task represented by FIG. 8C and a sensor-10B signal processing sub-task represented by FIG. 8D.

FIG. 9 illustrates an example of a task scheduling corresponding to the flow diagrams of FIGS. 8A-8D. The communication task and the four sub-tasks of the signal processing task are prioritized in the following order:

1. the sensor-10A edge detection sub-task (highest priority)
2. the sensor-10B edge detection sub-task
3. the sensor-10B signal processing sub-task
4. the sensor-10B signal processing sub-task
5. the communication task (lowest priority)

As can be seen by comparing FIG. 4 and FIGS. 8A-8D, the flow diagrams of FIGS. 8A, 8B representing the first signal processing task are basically formed by dividing the flow diagram of FIG. 4 into two. Specifically, steps S1-S3 of FIG. 4 correspond to steps S1A-S3A of FIG. 8A, and steps S4-S11 of FIG. 4 correspond to steps S4A-S11A of FIG. 8B. Likewise, the flow diagrams of FIGS. 8C, 8D representing the second signal processing task are basically formed by dividing the flow diagram of FIG. 4 into two. Specifically, steps S1-S3 of FIG. 4 correspond to steps S1B-S3B of FIG. 8C, and steps S4-S11 of FIG. 4 correspond to steps S4B-S11B of FIG. 8D.

As shown in FIG. 8A, the sensor-10A edge detection sub-task proceeds to step S12A after completion of step S3A. At step S12A, the CPU 22 launches the sensor-10A signal processing sub-task and then ends the sensor-10A edge detection sub-task. For example, the sensor-10A signal processing sub-task is launched according to a first flag. In this case, the CPU 22 sets the first flag at step S12A. During a period of time when the CPU 22 is idle, it is monitored whether the first flag is set. Then, upon detection that the first flag is set, the sensor-10A signal processing sub-task is launched.

As shown in FIG. 8C, the sensor-10B edge detection sub-task proceeds to step S12B after completion of step S3B. At step S12B, the CPU 22 launches the sensor-10B signal processing sub-task and then ends the sensor-10B edge detection sub-task. For example, the sensor-10B signal processing sub-task is launched according to a second flag. In this case, the CPU 22 sets the second flag at step S12B. During a period of time when the CPU 22 is idle, it is monitored whether the second flag is set. Then, upon detection that the second flag is set, the sensor-10B signal processing sub-task is launched.

As shown in (a) and (b) of FIG. 9, a period of a square drive signal of the yaw rate sensor 10A is different from (i.e., longer than) a period of a square drive signal of the yaw rate sensor 10B. An edge of the square drive signal of the yaw rate sensor 10A is detected in the sensor-10A edge detection sub-task, and an edge of the square drive signal of the yaw rate sensor 10B is detected in the sensor-10B edge detection sub-task. Since the period of the square drive signal of the yaw rate sensor 10A is different from (i.e., longer than) the period of the square drive signal of the yaw rate sensor 10B, count data set to the time counter 12A is different from (i.e., greater than) count data set to the time counter 12B. In the second embodiment, as shown in (h) and (i) of FIG. 9, the count data set to the time counter 12A is "99", and the count data set to the time counter 12B is "89".

The four sub-tasks of the signal processing task shown in (a)-(f) of FIG. 9 are successively performed in order of priority, as described below. In the sensor-10B edge detection sub-task shown in (d) of FIG. 9, when the edge of the square drive signal of the yaw rate sensor 10B is detected, the count data "89" is set to the time counter 12B as shown in (i) of FIG. 9. Then, the interrupt to the CPU 22 is enabled, and the sensor-10B signal processing sub-task is launched. However, at this time, the sensor-10A signal processing sub-task, which is prioritized higher than the sensor-10B signal processing sub-task, is in the waiting state. Therefore, the CPU 22 performs the sensor-10A signal processing sub-task prior to the sensor-10B signal processing sub-task. Then, upon completion of the sensor-10A signal processing sub-task, the CPU 22 switches to and performs the sensor-10B signal processing sub-task.

As shown in (g) and (h) of FIG. 9, when the time counter 12A reaches "0" during a time period when the CPU 22 is currently performing the communication task having the lowest priority, the CPU 22 suspends the communication task and then switches to and performs the sensor-10A edge detection sub-task. As long as the time counter 12A remains "0", the task switch timer 23 does output the task switch signal and the identifying signal even when the time counter 12B reaches "0".

As shown in (a), (c), and (h) of FIG. 9, in the sensor-10A edge detection sub-task, when the edge of the square drive signal of the yaw rate sensor 10A is detected, the count data "99" is set to the time counter 12A. Then, the interrupt to the CPU 22 is enabled, the sensor-10A edge detection sub-task is ended, and the sensor-10A signal processing sub-task is launched. However, the sensor-10B edge detection sub-task, which is prioritized higher than the sensor-10A signal processing sub-task is in the waiting state at this time. Therefore, the CPU 22 performs the sensor-10B edge detection sub-task prior to the sensor-10A signal processing sub-task. Then, upon completion of the sensor-10B edge detection sub-task, the CPU 22 switches to and performs the sensor-10A signal processing sub-task.

The sensor-10B edge detection sub-task is launched, when the time counter 12B reaches "0" ahead of the time counter 12A during the idle time of the CPU 22 after complication of the communication task. When the time counter 12A reaches "0" at the time when the CPU 22 is currently performing the sensor-10B edge detection sub-task, the CPU 22 suspends the sensor-10B edge detection sub-task and then switches to and performs the sensor-10A edge detection sub-task. If the time counters 12A, 12B reach "0" substantially at the same time, the CPU 22 performs the sensor-10A edge detection sub-task prior to the sensor-10B edge detection sub-task.

As described above, according to the second embodiment, the microcomputer 21 can process two sensor signals of two yaw rate sensors 10A, 10B in parallel. The signal processing task comprises four sub-tasks, i.e., the sensor-10A edge detection sub-task, the sensor-10B edge detection sub-task, the sensor-10A signal processing sub-task, and the sensor-10B signal processing sub-task.

Each of the sensor-10A edge detection sub-task and the sensor-10B edge detection sub-task is prioritized higher than each of the sensor-10A signal processing sub-task and the sensor-10B signal processing sub-task. Further, the sensor-10A edge detection sub-task and the sensor-10B edge detection sub-task have different priorities. The task switch timer 23 includes two time counters 12A, 12B. When one of the time counters 12A, 12B expires, the task switch timer 23 outputs the task switch signal and the identifying signal to the CPU 22. The identifying signal indicates which of the time counters 12A, 12B expires. That is, the identifying signal indicates whether the CPU 22 needs to switch to the sensor-10A edge detection sub-task or the sensor-10B edge detection sub-task. In such an approach, the edge of the square drive signal can be surely detected so that the sensor signal can be processed synchronously with the edge detection timing.

Third Embodiment

A microcomputer 31 (as a periodic signal processing apparatus) according to a third embodiment of the present invention is described below with reference to FIG. 10. Differences between the first and third embodiments are as follows.

Figure 10:
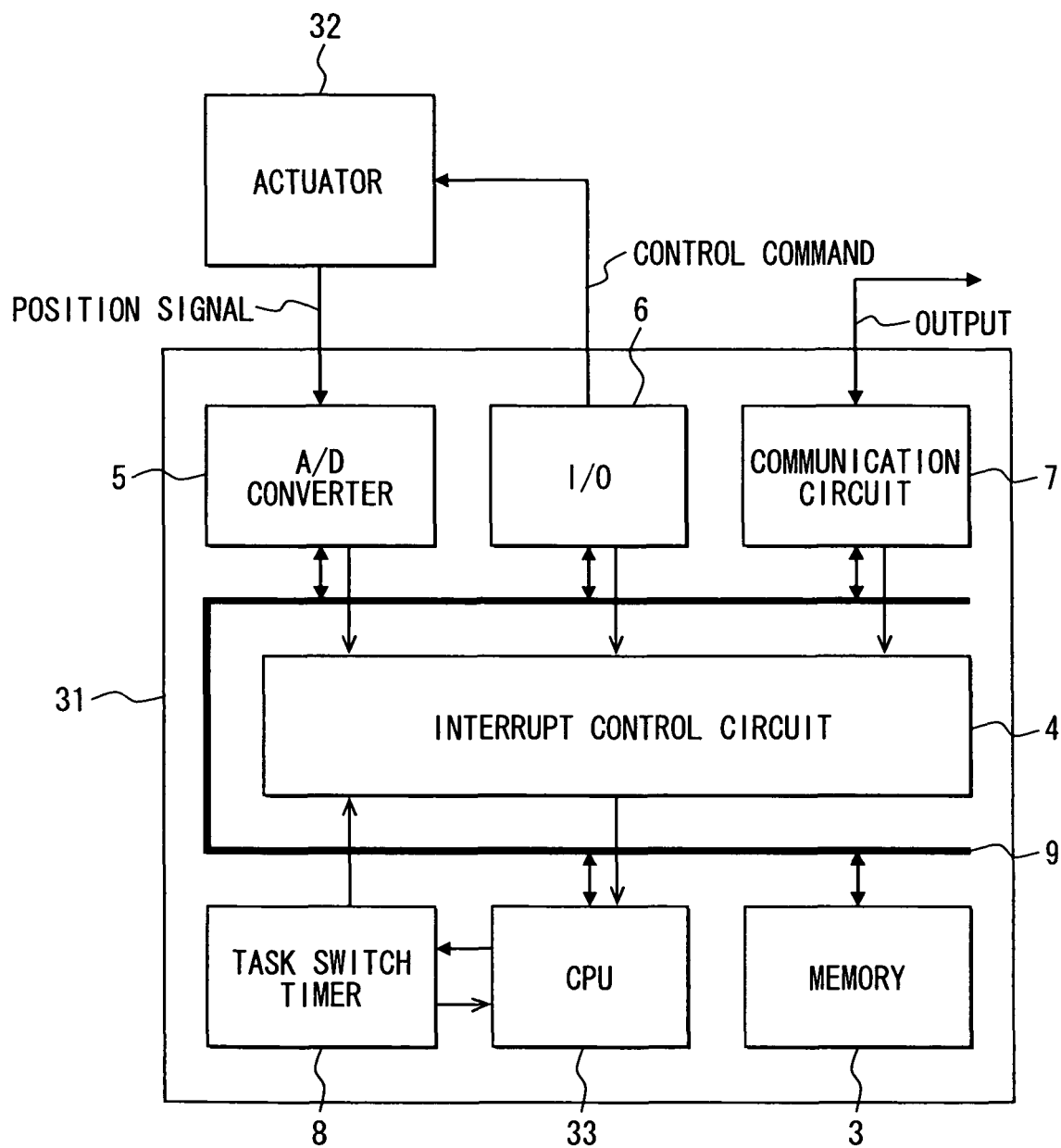
FIG. 10 is a block diagram of a signal processing apparatus according to a third embodiment of the present invention.

As can be seen by comparing FIGS. 1 and 10, the microcomputer 31 processes a position signal outputted from an actuator 32 (as a signal source). For example, the actuator 32 can be a motor, and the position signal can be a motor voltage or a motor current.

The microcomputer 31 includes a CPU 33 instead of the CPU 2. The CPU 33 receives an actuator control command (e.g., target rotation speed) from a host microcomputer (not shown) through the communication circuit 7. The CPU 33 drives and controls the actuator 32 through the I/O port 6 according to the control command. The actuator 32 generates an electric voltage and current depending on its operation condition. The microcomputer 31 receives the voltage or current as the position signal from the actuator 32. The received position signal is A/D-converted by the A/D converter 5.

For example, when the position signal is an induced voltage of a motor, the synchronization processing in the signal processing task is performed by detecting an interval between zero-crossing points of the induced voltage.

In this case, count data corresponding to an electric angle of, for example, 60° can be obtained by measuring the interval between zero-crossing points using a counter. A rotor position can be obtained based on the count data. Thus, for example, the motor can be controlled with a sine wave drive. Like the first embodiment, after the synchronization processing is completed, the count data is set to the task switch timer 8, and the interrupt to the CPU 33 is enabled.

As described above, according to the third embodiment, the microcomputer 31 can process the position signal outputted from the actuator 32 synchronously with the position signal.

(Modifications)

The embodiments described above can be modified in various ways. For example, the value of the count data set in the time counter can vary.

The interrupt control circuit can be eliminated. In such a case, the CPU can perform the interrupt control. Even if the communication task is in the wafting state at the time when the edge detection processing is completed in the signal processing task, the remainder of the signal processing task can be performed prior to the communication task. The CPU can perform the signal processing task and a task other than the communication task in parallel. The sensor signal can be high-pass filtered, band-pass filtered, or the like so that the filtered signal can contain a desired frequency. The task switch timer can be configured to serve as a countup timer. The CPU can perform a processing other than the synchronous detection, synchronously with the edge of the square drive signal. The correction processing performed at step S10 can be eliminated. The sensor as a signal source can be a sensor other than a yaw rate sensor. For example, the sensor can be an acceleration sensor. The phase signal can be a signal other than a square drive signal. The sensor can be a sensor that detects a physical quantity without oscillation. The periodic signal processing apparatus according to the embodiment can be applied to an apparatus other than an ECU mounted on a vehicle.

In the second embodiment, the number of the sensors can be three or more. The sensors can detect different physical quantities. For example, one the sensors can be a yaw rate sensor, and the other of the sensors can be an acceleration sensor.

In the third embodiment, the actuator can be a linear motor or the like.

Such changes and modifications are to be understood as being within the scope of the present invention as defined by the appended claims.

What is claimed is:

1. A periodic signal processing apparatus for receiving a periodic sensor signal and a phase signal outputted from a sensor and for processing the sensor signal, the sensor signal being responsive to a physical quantity detected by the sensor, the phase signal indicating a phase of the sensor signal, the periodic signal processing apparatus comprising:

a central processing unit (CPU) configured to execute a plurality of tasks in parallel; and a task switch timer configured to output a task switch signal to the CPU, the task switch signal switching an execution condition of the plurality of tasks executed by the CPU, wherein one of the plurality of tasks is a signal processing task for processing the sensor signal, the task switch timer disables an interrupt to the CPU and outputs to the CPU a signal for causing the CPU to stop executing instructions immediately before finishing counting of a time corresponding to a timer value, the task switch timer outputting to the CPU a switch signal for causing the CPU to execute the signal processing task after finishing counting of the time, when receiving the switch signal from the task switch timer, the CPU interrupts the executing task and then starts to execute the signal processing task, and in the signal processing task, the CPU performs a synchronization processing to synchronize with a sampling processing of the sensor signal by detecting an edge of the phase signal, sets the timer value to the task switch timer, and starts to perform the sampling processing by releasing the disabled condition of the interrupt that is sent to the CPU as an execution request of the other tasks.

2. The periodic signal processing apparatus according to claim 1, wherein in the signal processing task, the CPU performs a filtering processing of the sensor signal and performs the synchronization processing by using the phase signal so that a timing at which the sensor signal is sampled is kept constant.

3. The periodic signal processing apparatus according to claim 2, wherein the sensor outputs a square drive signal, as the phase signal, accompanying an oscillation action thereof, and in the signal processing task, the CPU performs the synchronization processing by detecting an edge of the square drive signal.

4. The periodic signal processing apparatus according to claim 3, wherein in the signal processing task, the CPU performs a synchronous detection by sampling the sensor signal synchronously with a timing at which the edge of the square drive signal is detected, the CPU performing a filtering processing of a result of the detection.

5. The periodic signal processing apparatus according to claim 2, wherein the CPU performs a correction processing of the sensor signal, derived from the filtering processing, according to characteristics of the sensor.

6. The periodic signal processing apparatus according to claim 1, wherein in the signal processing task, when the other task waits to be executed after the synchronization processing is finished, the CPU switches to execute the other task, and when the other task is finished, the CPU switches back to execute the signal processing task.

7. The periodic signal processing apparatus according to claim 1, wherein the sensor comprises a plurality of sensors, the signal processing task comprises signal processing sub-tasks and synchronization processing sub-tasks respectively corresponding to the plurality of sensors, the synchronization processing sub-tasks have higher priority than the signal processing sub-tasks, there are priorities among the synchronization processing sub-tasks respectively corresponding to the plurality of sensors, the task switch timer includes a plurality of counters respectively corresponding to the plurality of sensors, each counter outputs the task switch signal and an identifying signal when expiring, and the identifying signal indicates any signal processing task is to be executed.

* * * * *